J. WYMAN.
DRYING AND BAKING OVEN.
APPLICATION FILED AUG. 8, 1905.

914,099.

Patented Mar. 2, 1909.
2 SHEETS—SHEET 1.

Witnesses
Chas. K. Davis.
M. E. Moore.

Jasper Wyman Inventor
By Wm. N. Moore
Attorney

J. WYMAN.
DRYING AND BAKING OVEN.
APPLICATION FILED AUG. 8, 1905.

914,099.

Patented Mar. 2, 1909.
2 SHEETS—SHEET 2.

Witnesses
Chas. K. Davies
M. E. Moore

Jasper Wyman, Inventor

Attorney

UNITED STATES PATENT OFFICE.

JASPER WYMAN, OF MILLBRIDGE, MAINE.

DRYING AND BAKING OVEN.

No. 914,099.     Specification of Letters Patent.     Patented March 2, 1909.

Application filed August 8, 1905. Serial No. 273,230.

*To all whom it may concern:*

Be it known that I, JASPER WYMAN, a citizen of the United States, residing at Millbridge, in the county of Washington and State of Maine, have invented certain new and useful Improvements in Drying and Baking Ovens, of which the following is a specification.

The said invention relates to improvements in drying and baking ovens and is particularly applicable for use in treating fish, and principally sardines.

The object of the invention is the provision of an oven of this character which will accommodate a large quantity of fish to be baked or dried at one time; to facilitate the handling of the racks containing the fish to be treated, in inserting the same, and withdrawing the racks, after the fish are treated, from the oven, and to otherwise improve the construction of ovens of this character, providing easy access to the same.

The invention consists principally of an oven, and suitable furnaces beneath, provided with track ways extending through the oven above the furnace, and movable racks, having rollers or wheels adapted to run in the track ways, and provided with trays for the reception of the fish containing flakes, and the racks may be entered from either end of the oven.

Figure 1:
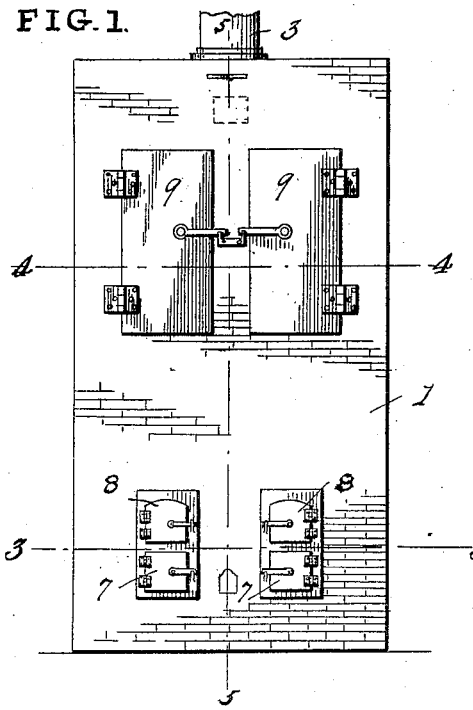
Figure 2:
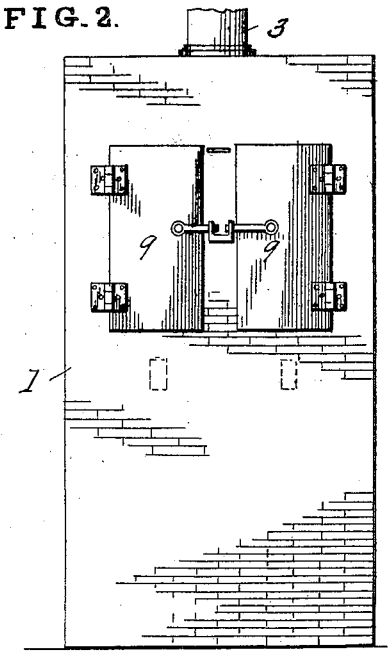
Figure 3:
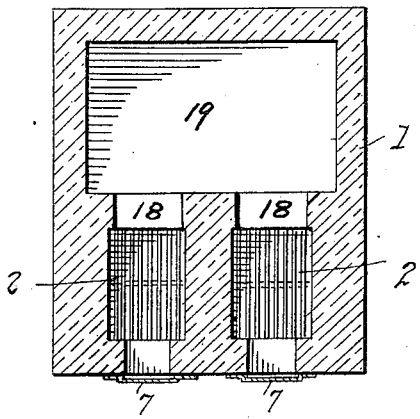
Figure 4:
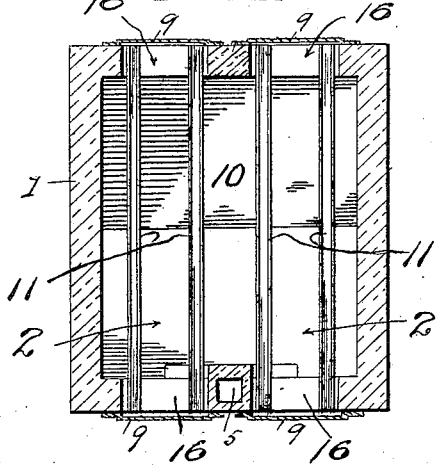
Figure 5:
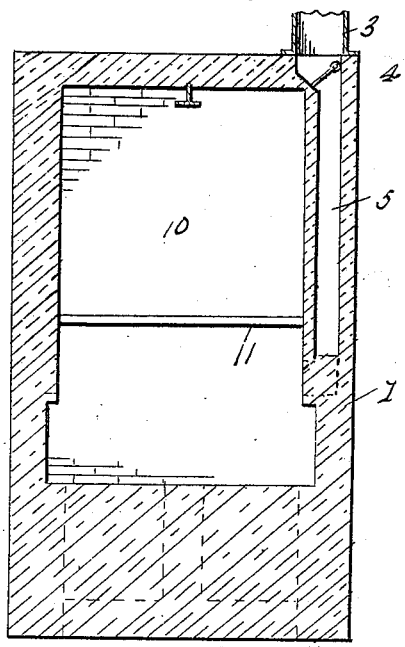
Figure 6:
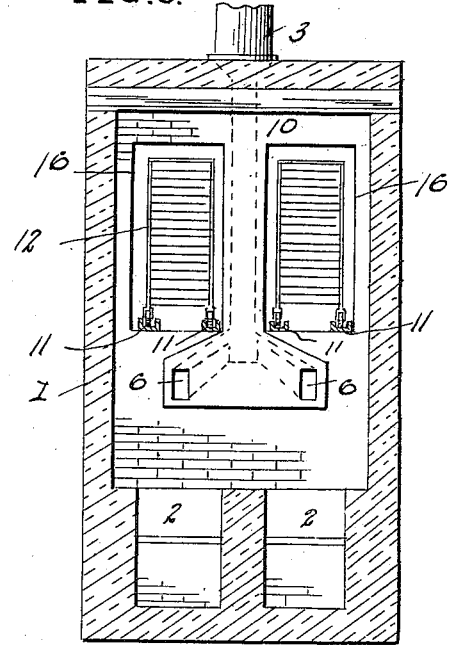
Figure 7:
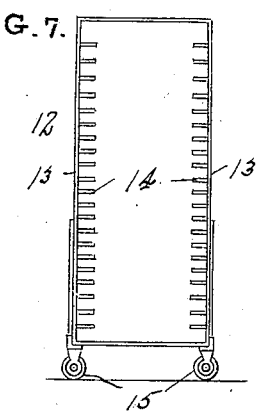
Figure 8:
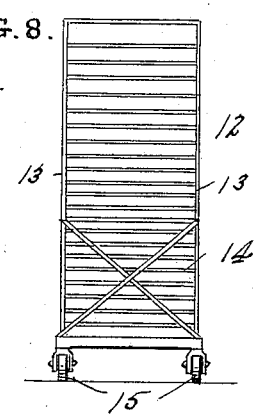

The invention further consists in certain novel features of construction and combinations and arrangements of parts as will be hereinafter specified, more particularly pointed out in the claims and as illustrated in the accompanying drawings, in which:

Figure 1 is a front elevation of an oven involving the principles of the invention. Fig. 2 is a rear elevation of the same. Fig. 3 is a cross section on line 3—3 Fig. 1, and Fig. 4 is a cross section on line 4—4 Fig. 1. Fig. 5 is a vertical longitudinal section taken on the line 5—5 Fig. 1. Fig. 6 is a similar section to Fig. 1, taken at right angles thereto, and Figs. 7 and 8 are respectively a side view and a front elevation of the flake rack used in connection with the oven.

Referring to the drawings, the numeral 1 designates the oven as a whole, provided with usual fire boxes or furnaces 2, 2, in this instance two fire boxes being illustrated which are in communication with the heating chamber 19, by means of the passages 18. A chimney 3 provided with a damper 4, is located at the upper end of the flue 5, the flue having openings 6 above the fire boxes to carry off the smoke therefrom. The fire boxes are provided with the usual ash doors 7 and feed doors 8 for access to the fire.

To facilitate the handling of the racks for the fish flakes and to expedite the insertion and removal of the same to and from the oven, I provide a pair of doors at each end of the furnace or oven, as indicated at 9, 9, 9, 9, which are provided with usual fastening means.

In the chamber 10 which forms the oven for baking or drying the fish, I locate the horizontal channel beams 11, 11, 11, 11, which form the tracks for the racks 12, to run on. These channel beams are arranged in pairs, as shown at each side of the oven, and preferably extend from one door to the complementary door on the other side of the furnace, thus providing means for running the racks from one door to the other so that in treating the fish the rack may enter one door and be taken out at the other door, if desired.

The racks used in connection with the furnace, as illustrated in Figs. 7 and 8, are constructed preferably of metal uprights 13 and provided with a number of trays as 14, for the reception of the flakes containing the fish to be dried; and are further provided with wheels 15 to travel in the track or ways 11 in the oven.

In operation, the flakes containing the fish are placed on the trays 14 of the racks 12 and the racks are then run through the doorways 16 onto the tracks 11, in the oven over the fires in the boxes. After a suitable time has elapsed, sufficient to treat the fish to the required state, the racks are run out at the other end of the track through the opposite door. The racks may be run in and taken out collectively, or a continuous movement of the racks in and out, one at a time may be employed, as is found desirable.

From the above description taken in connection with the drawings, it becomes obvious that I have produced an oven of the character described which will fulfil all the conditions set forth as the objects and purpose of my invention.

Various modifications may be employed in the physical embodiment of the invention: the oven may be constructed of other material than brick, as shown; the number of tracks in the oven may be varied to suit the size of the oven as desired, and further minor changes in construction may be made without departing from the spirit of the invention

Having thus fully described my invention, what I claim as new and desire to secure by Letters Patent is:

1. In a device for drying fish and the like, the combination with an oven, a pair of doors at each end thereof, horizontal channel beams in said oven arranged in pairs extending from one side to the other of the oven, movable racks on said tracks, and a plurality of fire boxes located under the oven, a vertical flue substantially horizontal divergent flues, each having an opening above one of the fire boxes, and a chimney forming an outlet to the flue.

2. In a device for drying fish and the like, the combination with an oven, a pair of doors at each end thereof, horizontal channel beams in said oven arranged in pairs extending from one side to the other of the oven, movable racks on said tracks, and a plurality of fire boxes located under the oven, a vertical flue substantially horizontal divergent flues, each having an opening above one of the fire boxes, and a chimney forming an outlet to the flue, the said tracks being disposed upon opposite sides of the vertical flue.

3. In a device for drying fish and the like, the combination with an oven, a pair of doors at each end thereof, horizontal channel beams in said oven arranged in pairs extending from one side to the other of the oven, movable racks on said tracks, and a plurality of fire boxes located under the oven, a vertical flue substantially horizontal divergent flues, each having an opening above one of the fire boxes, and a chimney forming an outlet to the flue, the said tracks being disposed upon opposite sides of the vertical flue, and a heating chamber in communication with said fire boxes by lateral passages.

4. The heating and drying oven herein shown and described, comprising a pair of fire boxes, a heating chamber in rear of the fire boxes and connected therewith by horizontal passages, an oven chamber above the heating chamber of the full size of the structure, doors at the ends of said oven chamber, channel irons extending through the oven chamber from door to door, a vertical flue between said channel irons at one end of the structure, a chimney extending above the oven and communicating with said vertical flue, a damper in said chimney, and converging flues leading from the heating chamber to the chimney.

5. A heating and drying oven consisting of fire boxes, a heating chamber in rear of the fire boxes and in connection with the fire boxes by horizontal passages, an oven chamber above the heating chamber and fire boxes of the full size of the structure, pairs of doors at the ends of the oven chamber, channel irons extending the length of the oven chamber from door to door, a vertical flue at one end of the structures between the tracks formed by said channel ends, a chimney at one end of the structure communicating with said vertical flue, a damper in the chimney, and flues leading from the heating chamber to the chimney 6. A heating oven comprising a series of fire boxes, a heating chamber directly in rear of the fire boxes and in communication therewith by a horizontal passage, an oven chamber extending over the fire boxes and in direct communication with the heating chamber, doors in the ends of the oven chamber and elevated above the fire boxes, rails extending from one door to the other the full length of the oven chamber, a chimney at one end of the chamber, and flues leading from the heating chamber to the chimney.

In testimony whereof I affix my signature in presence of two witnesses.

JASPER WYMAN.

Witnesses:
CHARLES A. STEWART,
JAMES S. WYMAN.